(12) United States Patent
Bohle, II et al.

(10) Patent No.: US 10,047,908 B1
(45) Date of Patent: Aug. 14, 2018

(54) DEFORMABLE PIN LOCKING MECHANISM FOR ROBOTIC TOOL CHANGER

(71) Applicant: ATI Industrial Automation, Inc., Apex, NC (US)

(72) Inventors: David John Bohle, II, Garner, NC (US); Michael Joseph Gala, Raleigh, NC (US)

(73) Assignee: ATI Industrial Automation, Inc., Apex, NC (US)

( * ) Notice: Subject to any disclaimer, the term of this patent is extended or adjusted under 35 U.S.C. 154(b) by 0 days.

(21) Appl. No.: 15/628,230

(22) Filed: Jun. 20, 2017

(51) Int. Cl.
```
B23B 31/171      (2006.01)
B25J 15/04       (2006.01)
F16P 3/02        (2006.01)
G05B 9/02        (2006.01)
B23Q 3/157       (2006.01)
B23Q 3/155       (2006.01)
```
(52) U.S. Cl.
CPC .............. *F16P 3/02* (2013.01); *B25J 15/0408* (2013.01); *G05B 9/02* (2013.01); *B23Q 3/1554* (2013.01); *B23Q 3/15713* (2013.01); *B23Q 2003/155404* (2016.11)

(58) Field of Classification Search
CPC ........... F16P 3/20; G05B 9/02; B25J 15/0408; B23Q 2003/155404; B23Q 3/1554; B23Q 3/15713; Y10T 279/17752; Y10T 279/17726; Y10T 279/17145; Y10T 279/17196; Y10T 279/17717

See application file for complete search history.

(56) References Cited

U.S. PATENT DOCUMENTS

2002/0027329 A1\* 3/2002 Schill .................. B23B 31/1071 279/71
2007/0228671 A1\* 10/2007 Norton ................ B23B 31/1071 279/2.11
2012/0252646 A1\* 10/2012 Norton ................ B23B 31/1071 483/16

\* cited by examiner

*Primary Examiner* — Daniel Howell
*Assistant Examiner* — Paul M Janeski
(74) *Attorney, Agent, or Firm* — Coats & Bennett, PLLC

(57) ABSTRACT

A robotic tool changer includes a locking feature, and may be made washable by sealing against fluid incursion. The tool changer comprises a master unit and one or more tool units, and it transitions between decoupled and coupled states by rotation of one part relative to another. The rotation displaces rolling members in the master unit, such as balls, from a retaining surface to a locking surface which is sized and positioned to force the rolling members against a coupling surface of the tool unit. A deformable pin interposed between the retaining and locking surfaces resists movement of the rolling members therebetween, requiring the application of force. The pin remains deformed, and continues to exert a force on the rolling members, when the robotic tool changer is in the coupled state, providing a locking feature which automatically and positively resists any inadvertent decoupling of the tool changer.

16 Claims, 12 Drawing Sheets

DEFORMABLE PIN LOCKING MECHANISM FOR ROBOTIC TOOL CHANGER

FIELD OF INVENTION

The present invention relates generally to robotic tool changers, and in particular to a robotic tool changer using a deformable pin as a locking mechanism.

BACKGROUND

Industrial robots have become an indispensable part of modern manufacturing. Robots perform many manufacturing tasks tirelessly, in hostile environments, and with high precision and repeatability.

In many robotic manufacturing applications, it is cost-effective to utilize a relatively generic robot arm to accomplish a variety of tasks. In these applications, a tool changer is used to attach different tools to the robot. One half of the tool changer, called the master unit, is permanently affixed to a robot arm. The other half, called the tool unit, is affixed to each tool that the robot may utilize. When the robot arm positions the master unit adjacent a tool unit connected to a desired tool, a coupling mechanism is actuated that mechanically locks the master and tool units together, thus affixing the tool to the end of the robot arm.

Robotic tool changer coupling mechanisms may be powered and automatic (i.e., operated under software control), or may be manually actuated. In many cases, manually actuated tool changers are preferred, as they may have lower cost and higher reliability than powered tool changers, as well as obviating the need for electrical power or pneumatic fluid on the robot arm. Additionally, applications such as food preparation or robotic surgery require that the entire system—including the tool changer—be "washable," or capable of being easily sanitized, such as by dousing with antimicrobial fluid. In these applications, a design in which the coupling mechanism may be sealed against fluid intrusion is highly desirable.

A major concern in robotic manufacturing is safety. For example, ISO 13849, "Safety of machinery—Safety related parts of control systems," defines five Performance Levels, denoted A through E. Performance Level D (PLD), mandated for many industrial robotics applications, requires a probability of less than $10^{-6}$ dangerous failures per hour—that is, at least a million hours of operation between dangerous failures. For a robotic tool changer, a dangerous failure would be the tool unit decoupling and separating from the master unit while in operation, resulting in dropping the attached tool. Accordingly, a robotic tool changer having a feature that positively locks it into a coupled state, and which minimizes or eliminates the probability of master and tool unit separation, is highly desirable.

The Background section of this document is provided to place embodiments of the present invention in technological and operational context, to assist those of skill in the art in understanding their scope and utility. Approaches described in the Background section could be pursued, but are not necessarily approaches that have been previously conceived or pursued. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to one or more embodiments described and claimed herein, a robotic tool changer, comprising a master unit and one or more tool units, transitions between decoupled and coupled states by rotation of one part relative to another part. The rotation displaces rolling members in the master unit, such as balls, from a retaining surface to a locking surface which is sized and positioned to force the balls against a coupling surface of the tool unit. A deformable pin interposed between the retaining and locking surfaces resists movement of the rolling members therebetween, requiring the application of force. The pin remains deformed, and continues to exert a force on the rolling members, when the robotic tool changer is in the coupled state, providing a locking feature which automatically and positively resists any inadvertent decoupling of the tool changer.

One embodiment relates to a robotic tool changer. The robotic tool changer includes a tool unit operative to be affixed to one of a robot arm and a robotic tool, and including a coupling surface; and a master unit operative to be affixed to the other of the robot arm and the robotic tool. The master unit includes a plurality of rolling members; a retention collar comprising a cylindrical sleeve having a corresponding plurality of passages formed therein, each passage operative to partially contain a rolling member; an actuation unit abutting the retention collar and having a corresponding plurality of multi-faceted actuation surfaces, each including at least a retaining surface and a locking surface; and a deformable pin interposed between each retaining surface and corresponding locking surface, and operative to hinder movement of the rolling member between the retaining and locking surfaces.

Another embodiment relates to a method of coupling a robotic tool changer master unit to a tool unit. A tool unit having a coupling surface, and a master unit are provided. The master unit comprises a retention collar including a plurality passages holding rolling members, and an actuation unit comprising a corresponding plurality of multi-faceted actuation surfaces, each including at least a retaining surface and a locking surface. The master and tool units are moved together. The actuation unit is rotated relative to the retention collar and tool unit, so as to move the rolling members from the respective retaining surfaces to the respective locking surfaces, thus pressing the rolling members against the coupling surface. A pin interposed between each retaining and locking surfaces is deformed, such that each deformed pin exerts a force on the corresponding rolling member, seating it against the locking surface.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

DETAILED DESCRIPTION

For simplicity and illustrative purposes, the present invention is described by referring mainly to exemplary embodiments thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

Figure 1A:
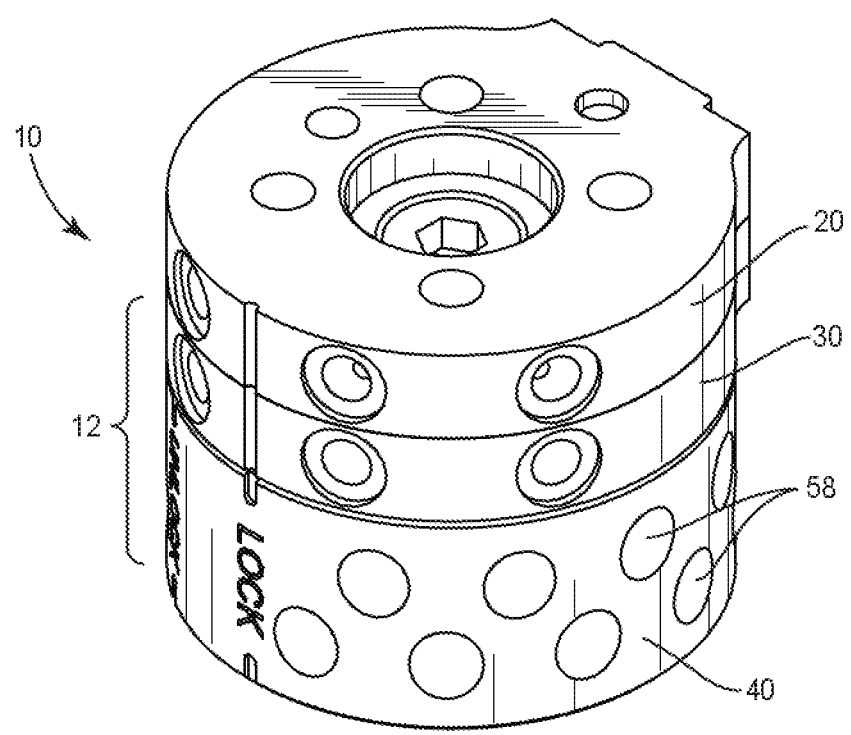
FIG. 1A is a perspective view of one embodiment of a robotic tool changer in a coupled state.
Figure 1B:
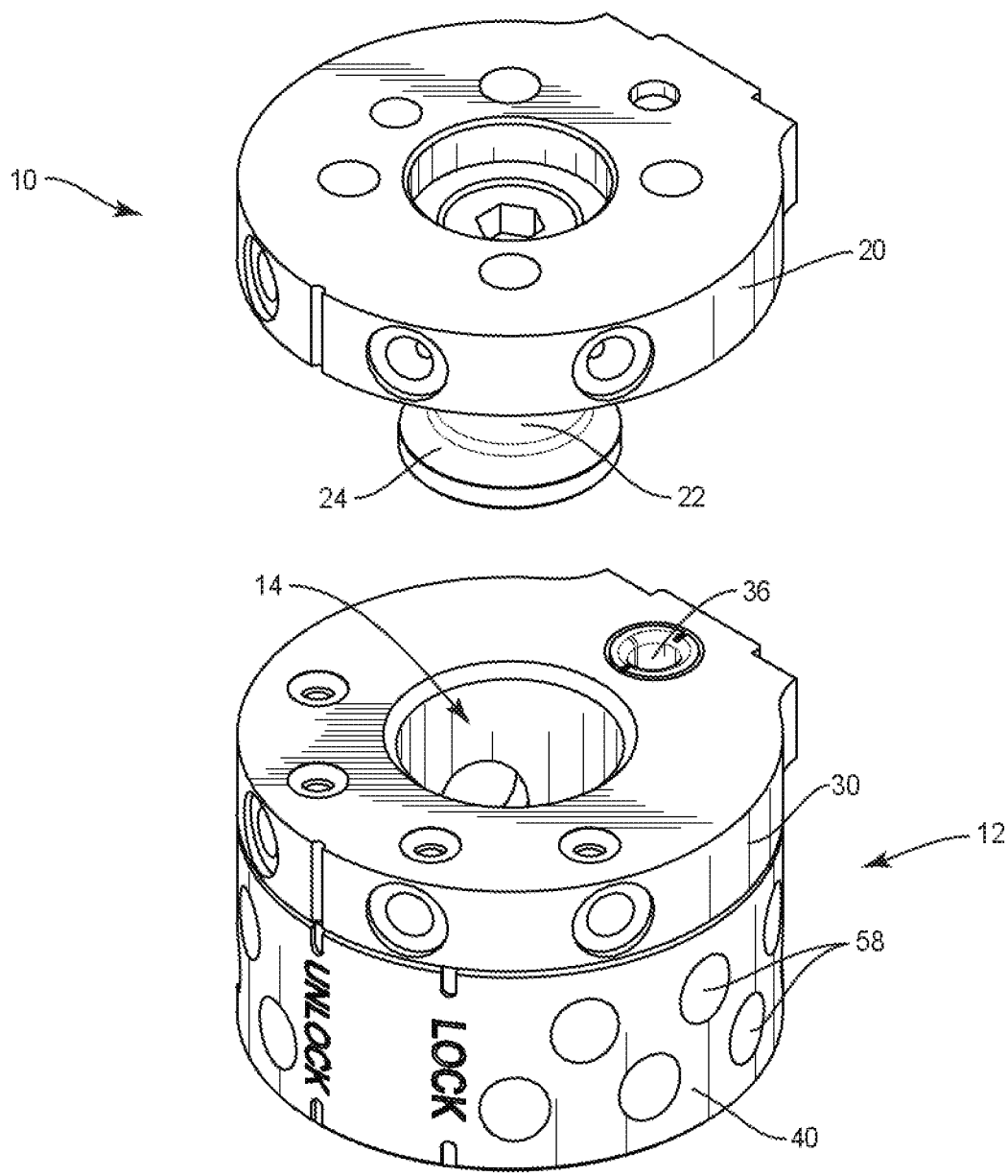
FIG. 1B is a perspective view of the robotic tool changer of FIG. 1A in a decoupled state.

FIG. 1A depicts a robotic tool changer 10, according to one embodiment, in the coupled state. The robotic tool changer 10 comprises a master unit 12 and a tool unit 20. FIG. 1B depicts the robotic tool changer 10 in a decoupled state, with the master unit 12 and tool unit 20 separated. The master unit 12 is normally affixed to a robot arm (not shown), and a tool unit 20 is affixed to each tool (not shown) which may be attached to the robot arm. To achieve the most cost effective tool changer solution, the coupling mechanism (and additionally any electronics or the like) are located in master unit 12, only one of which is required per robot. The tool unit 20, one of which is required for each different tool, contains no moving parts and is hence cheaper. However, if desired, the configuration could be reversed, with the tool unit 20 attached to the robot arm and a master unit 12 on each tool.

In the embodiment depicted, the master unit 12 includes a central bore 14. The tool unit 20 includes a stem 22, with a coupling surface 24 comprising a circumferential lip on, e.g., the distal end of the stem 22. To couple the tool unit 20 to the master unit 12, the stem 22 of the tool unit 20 is disposed within the bore 14, and the coupling mechanism is actuated. The robotic tool changer 10 in this embodiment is manually actuated, although in another embodiment the same or a substantially similar coupling mechanism could be utilized in a powered or automatic robotic tool changer.

Figure 2:
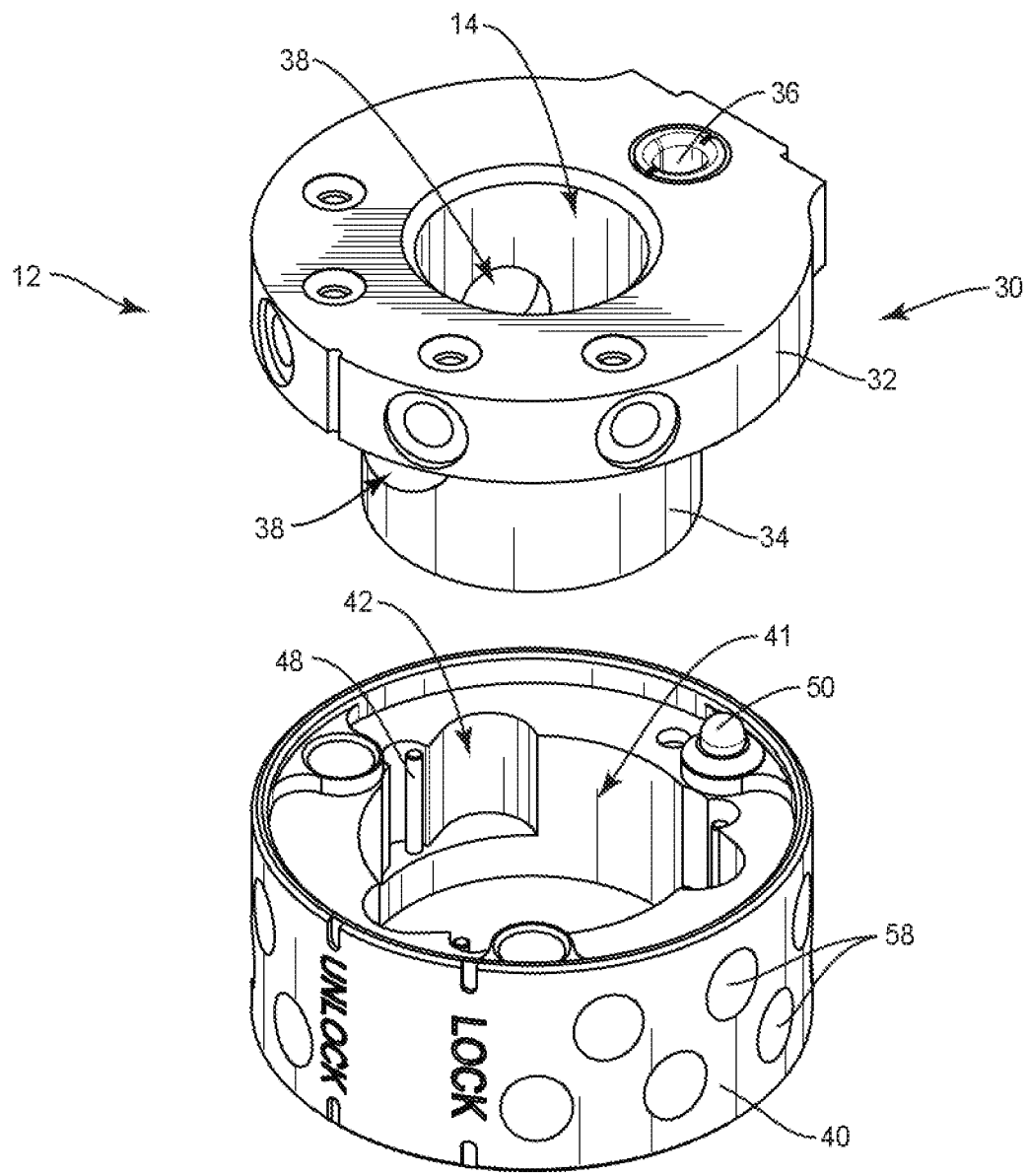
FIG. 2 is an exploded perspective view of the master unit of the robotic tool changer of FIGS. 1A and 1B.

FIG. 2 depicts the constituent parts of the master unit 12. In this embodiment, the master unit 12 comprises a holding unit 30 and an actuation unit 40. The holding unit 30 comprises a cap 32 and a retention collar 34. The inner surface of the retention collar 34 defines the central bore 14 of the master unit 12. The retention collar 34 is disposed within a larger bore 41 formed in the actuation unit 40. The actuation unit 40 is operative to partially rotate about the retention collar 34. A hole 36 formed in the upper surface of the cap 32 receives a locating pin (not shown) on the tool unit 20, locking the holding unit 30 and tool unit 20 together, preventing rotation with respect to each other.

The retention collar 34 includes a plurality of passages 38, each of which holds a rolling member 16, as best seen in FIGS. 3-4. Each rolling member 16 has a diameter greater than the thickness of the retention collar 34. In the embodiment depicted, the rolling members 16 are metal spheres. However, in another embodiment, the rolling members 16 may comprise vertically oriented cylinders. The diameter of the passages 38 is slightly greater than the diameter of the rolling members 16, allowing the rolling members 16 to freely traverse the passages 38. To prevent loss of the rolling members 16 when the robotic tool changer 10 is decoupled, one end of each passage 38 has a diameter slightly less than the diameter of the rolling member 16. In the embodiment depicted in FIGS. 1-4, the inner end of each passage 38—that is, the end opening to the central bore 14—is restricted. Thus, almost half of the rolling member 16 may protrude from that end of its passage 38, but cannot fall out of the passage 38 when the stem 22 of the tool unit 20 is removed. The other end of the passage 38 is, like the bore of the passage 38, slightly larger than the diameter of the rolling member 16.

Figure 3B:
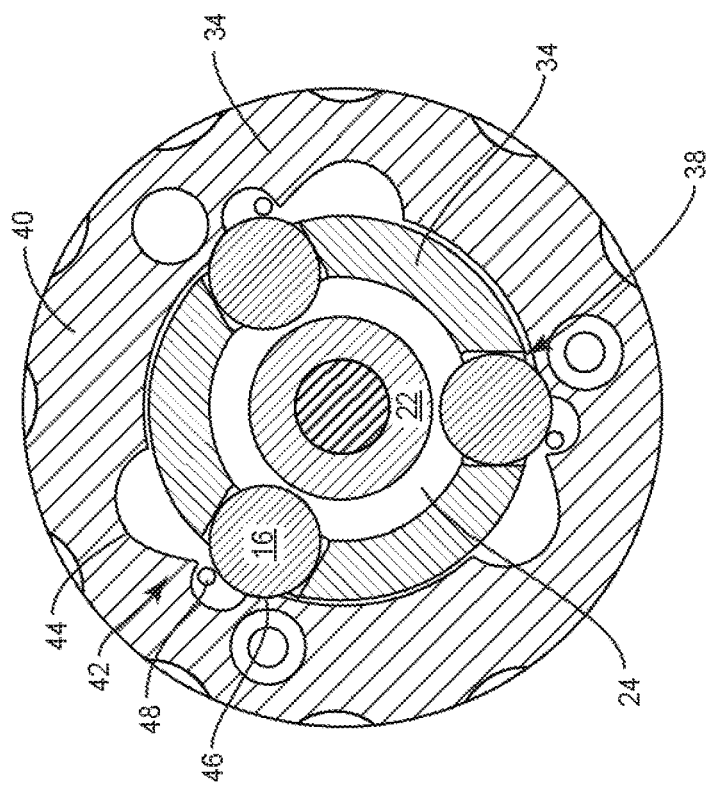
FIG. 3B is a top sectional view of the robotic tool changer of FIGS. 1 and 2 in a coupled state.
Figure 3A:
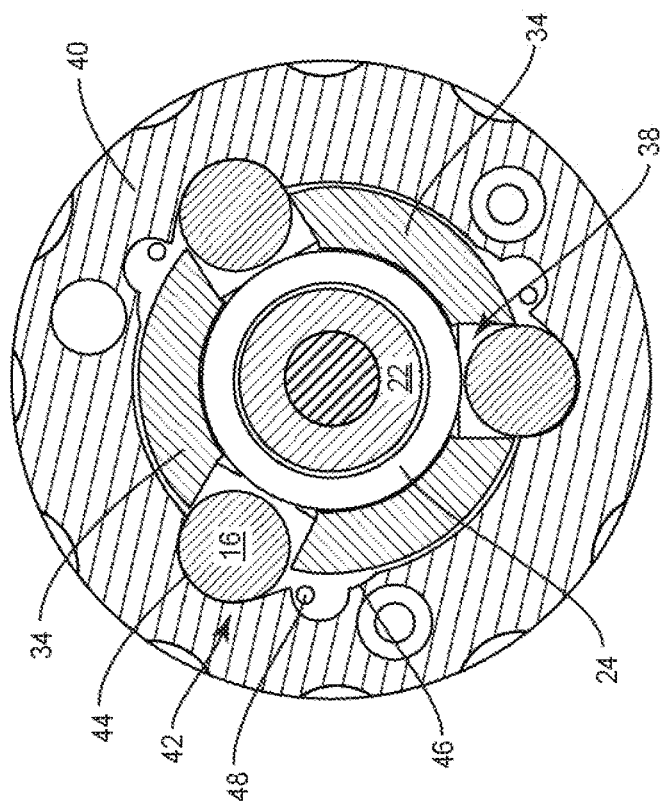
FIG. 3A is a top sectional view of the robotic tool changer of FIGS. 1 and 2 in a decoupled state.
Figure 4B:
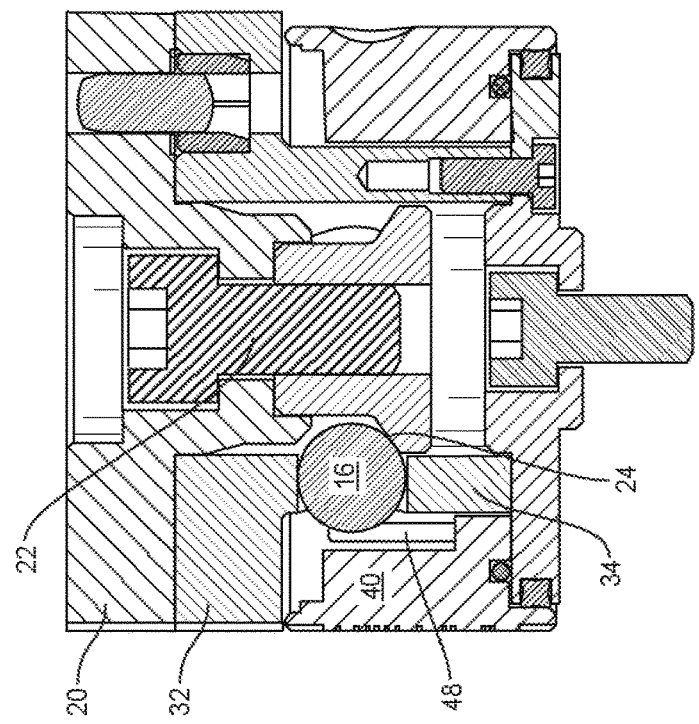
FIG. 4B is a side sectional view of the robotic tool changer of FIGS. 1-3 in a coupled state.
Figure 4A:
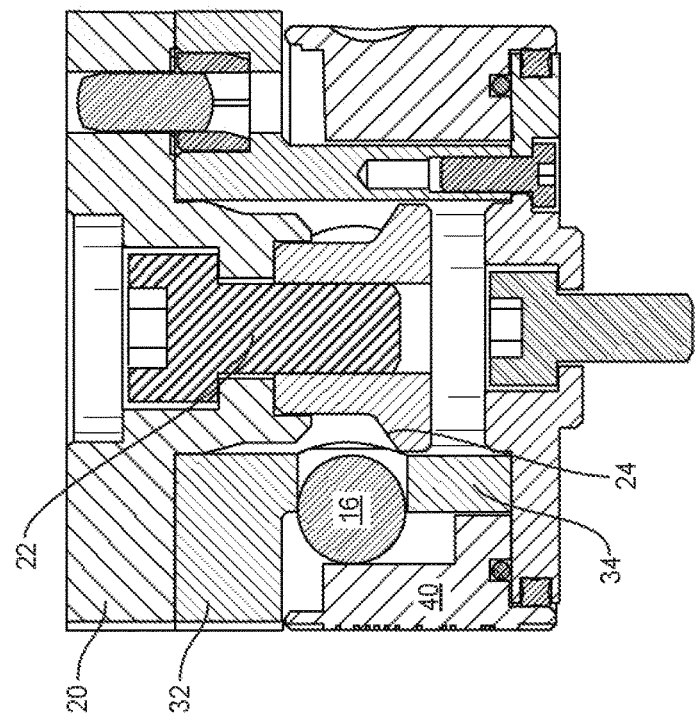
FIG. 4A is a side sectional view of the robotic tool changer of FIGS. 1-3 in a decoupled state.

FIG. 3A is a top section view of the tool changer 10 in a decoupled state; FIG. 4A is a side section view of the decoupled state. FIG. 3B is a top section view of the tool changer 10 in a coupled state; FIG. 4B is a side section view of the coupled state. As best seen in FIGS. 3A and 3B, arranged around the inner surface of the actuation unit 40 is a plurality of multi-faceted actuation surfaces 42. Each multi-faceted actuation surface 42 includes a retaining surface 44 and a locking surface 46. The retaining surface 44 is a recess, sized and shaped to receive the rolling member 16 when the tool changer 10 is in a decoupled state. As depicted in FIGS. 3A and 4A, when seated against the retaining surface 44, each rolling member 16 is retracted into its passage 38 at least as far as the inner surface of the retention collar 34. This allows the stem 22 of the tool unit 20 to freely enter and exit the bore 14 of the master unit 12.

To move the tool changer 10 to the locked position of FIGS. 3B and 4B, the actuation unit 40 is rotated, relative to the retention collar 30 (clockwise in FIGS. 3A and 3B), until each rolling member 16 is seated against the locking surface 46. The locking surface 46 is also sized and shaped to match the contour of the rolling member 16, but is positioned so as to force the rolling member 16 to displace through the passage 38 in the retention collar 34, and press against the coupling surface 22 of the tool unit 20, thus locking the tool unit 20 and master unit 12 together.

Interposed between each retaining surface 44 and locking surface 46 is a deformable pin 48. The pin 48 is located such that, to transition from the retaining surface 44 to the locking surface 46, the rolling member 16 must at least slightly deform the pin 48. Furthermore, in the coupled state, with the rolling member 16 seated against the locking surface 46 and pressing against the coupling surface 22 of the tool unit 20, the rolling member 16 continues to deform the pin 48, which in turn exerts a force on the rolling member 16, holding it against the locking surface 46. The feature positively locks the robotic tool changer 10 in the coupled state. To exit the coupled state, the actuation unit 40 must be rotated, relative to the retention collar 34 (counter-clockwise as depicted in FIGS. 3A and 3B). This will require further deformation of the pin 48, requiring the application of positive rotational force. The force applied by the deformed pin 48 against the rolling member 16 in the coupled state, holding the rolling member against the locking surface 46 and hence against the coupling surface 22, is a feature that locks the robotic tool changer 10 in the coupled state, eliminating or greatly reducing the chance of inadvertent decoupling.

In the embodiment depicted, the deformable pin 48 is fixed-free, meaning one end of the pin 48 is fixed to the actuation unit 40 body, and the other end is not. In another embodiment, the deformable pin 48 may be fixed-fixed, with both ends secured. The size of the pin 48, its location in the path of the rolling member 16, the material from which the pin 48 is made, and whether it is mounted fixed-free or fixed-fixed, are all factors that determine the force required to transition the robotic tool coupler 10 between decoupled and coupled states, and the force holding the robotic tool coupler 10 in the coupled state.

Figure 5:
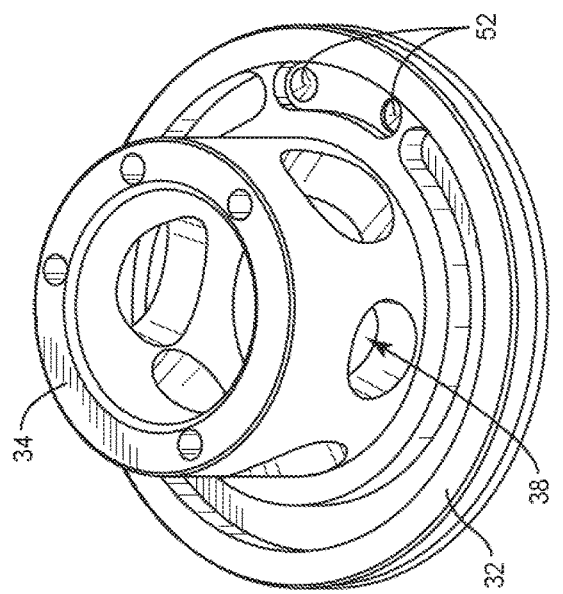
FIG. 5 is a perspective view of a retention collar of the robotic tool changer of FIGS. 1-4.

In the embodiment depicted in FIGS. 1-3, the actuation unit 40 rotates, relative to the holding unit 30, through an angle of approximately 32°. As depicted in FIG. 1B, alignment marks or notches in the tool unit 20 and holding unit 30 alternately align with indicators or labels, such as "unlock" and "lock," to indicate the state of the coupling mechanism. In one embodiment, further tactile and audible feedback of the state of the coupling mechanism is provided by a detent mechanism. FIG. 2 depicts a detent ball 50, biased upwardly, such as by a spring (not shown). FIG. 5 depicts detent recesses 52 the underside of the cap 32 of the holding unit 30. The recesses 52 are positioned such that the detent ball 50 seats in one or the other recess 52 when the robotic tool changer 10 is in the fully coupled or decoupled state. In one embodiment, the detent mechanism provide an audible "click" upon reaching either the decoupled or coupled state, and requires a slight initial force to transition the tool changer 10 out of either state.

Referring to FIGS. 1-2, in a manually actuated embodiment, the outer surface of the actuation unit 40 may include frictional features 58, such as oversized "golf ball" dimples, to facilitate a finger grip for manually turning the actuation unit 40. In other manual embodiments, a handle or other gripping means may be provided to facilitate rotating the actuation unit 40. In automated embodiments, a motor, pneumatic piston, or the like, or a mechanical linkage to such a drive mechanism, may be provided.

Figure 6:
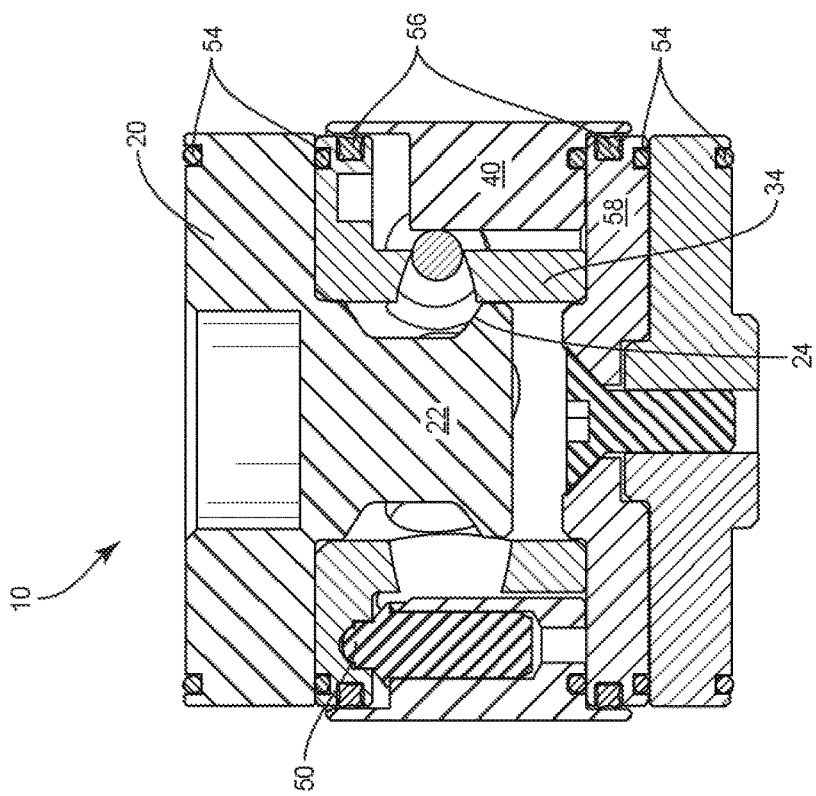
FIG. 6 is a side sectional view of a washable robotic tool changer.

In many applications, such as food preparation, robotic surgery, and the like, the robots, tools attached to it, and all other system components, including a robotic tool changer 10, must be washable, e.g., with antimicrobial fluid. In one embodiment, elastomeric sealing members are used to hermetically seal the interior of the robotic tool changer 10 from the exterior. FIG. 6 depicts a side section view of one embodiment of a robotic tool changer 10 in which two types of elastomeric sealing members are used. O-rings 54 are disposed between the tool unit 20 and a tool (not shown), between the tool unit 20 and holding unit 30, between the actuation unit 40 and a base plate 58, and between the master unit 12 and the robot arm (not shown). Also, quad rings 56 seal the interior of the master unit 12 from the exterior, at the contact between the annular surface of the actuation unit 40 and the cap 32 of the holding unit 30, and also at contact between the actuation unit 40 and the base plate 58. The elastomeric sealing members 54, 56 may be formed of rubber, TEFLON®, or other suitable material. The elastomeric sealing members 54, 56 are operative to seal the interior of the robotic tool changer 10 from the exterior, allowing the entire tool changer 10 to be washed, or even immersed in fluid, without allowing penetration of the fluid to the interior. Conversely, the components of the coupling mechanism need not be rigorously sanitized, since any oil or the like is sealed against escape to the ambient environment by the elastomeric sealing members 54, 56.

FIGS. 7-10 depict another embodiment of the robotic tool changer 110. In this embodiment, the coupling mechanism action is essentially reversed from that described and pictured with respect to FIGS. 1-5. Corresponding parts are numbered correspondingly, with 100 added to distinguish this embodiment.

Figure 7A:
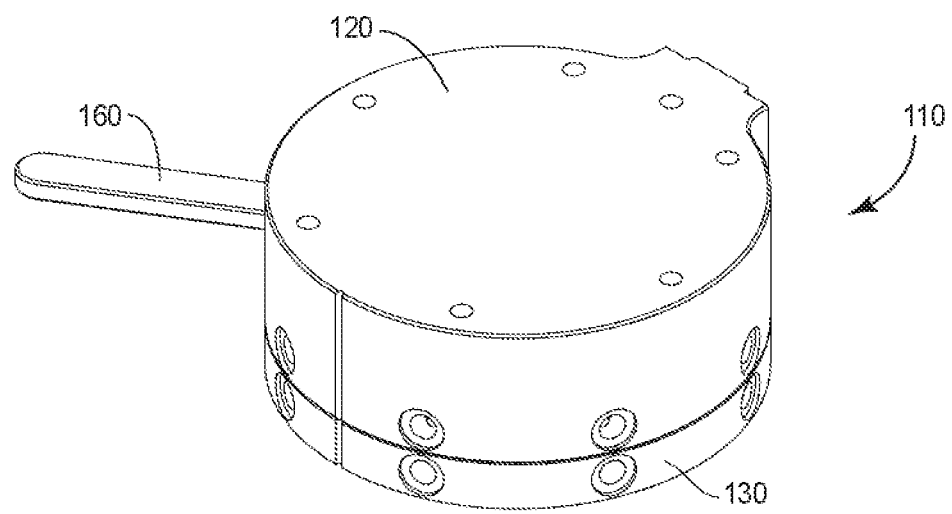
FIG. 7A is a perspective view of another embodiment of a robotic tool changer in a coupled state.
Figure 7B:
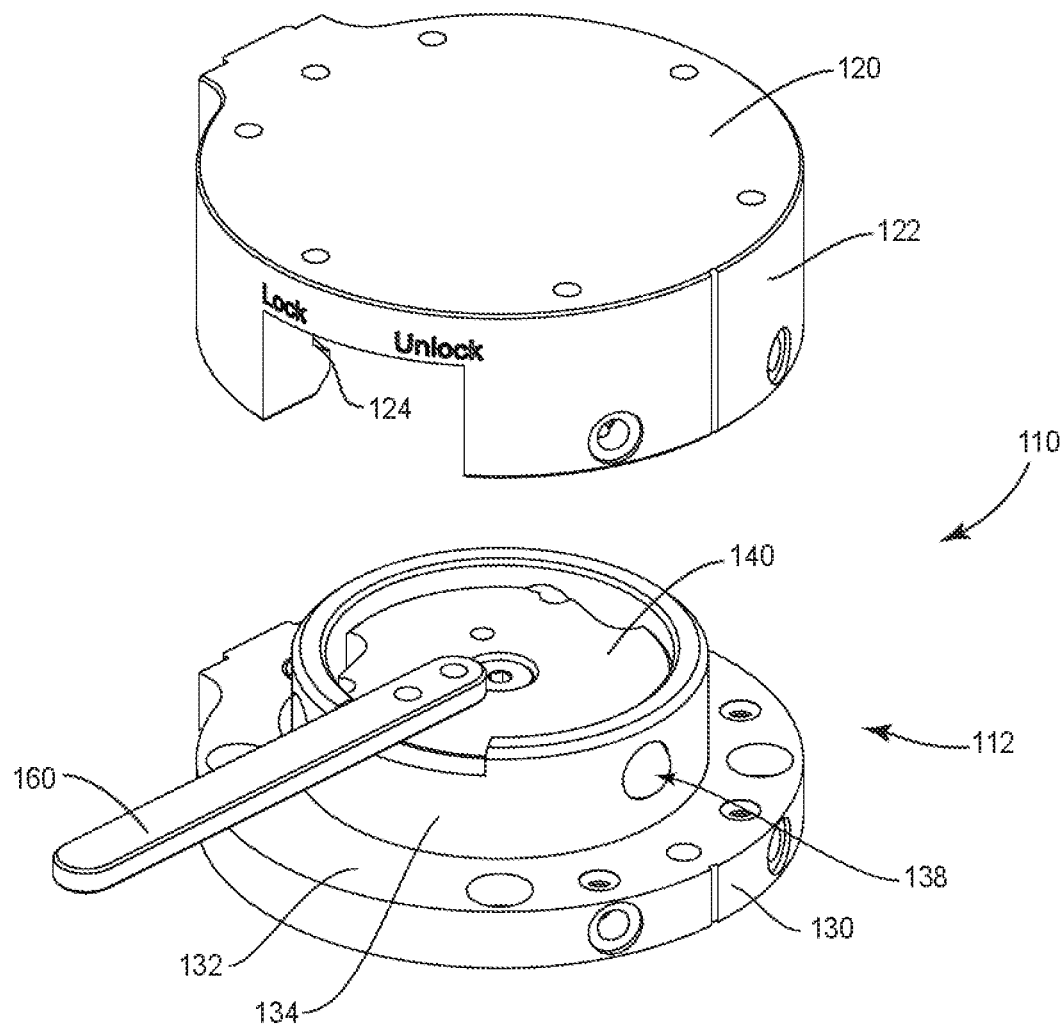
FIG. 7B is a perspective view of the robotic tool changer of FIG. 7A in a decoupled state.

FIG. 7A depicts a robotic tool changer 110, according to one embodiment, in the coupled state. FIG. 7B depicts the robotic tool changer 110 in a decoupled state, with the tool unit 120 and master unit 112 and separated. In this embodiment, the tool unit 120 includes a cylindrical sleeve 122. A coupling surface 124 is formed on a lip on the inner surface of the sleeve 122, such as at the distal end thereof. A cap 121 is operative to attach to a robotic tool (or, if desired, a robot arm). In this embodiment, the tool unit 120 fits over the coupling mechanism of the master unit 112.

Figure 8:
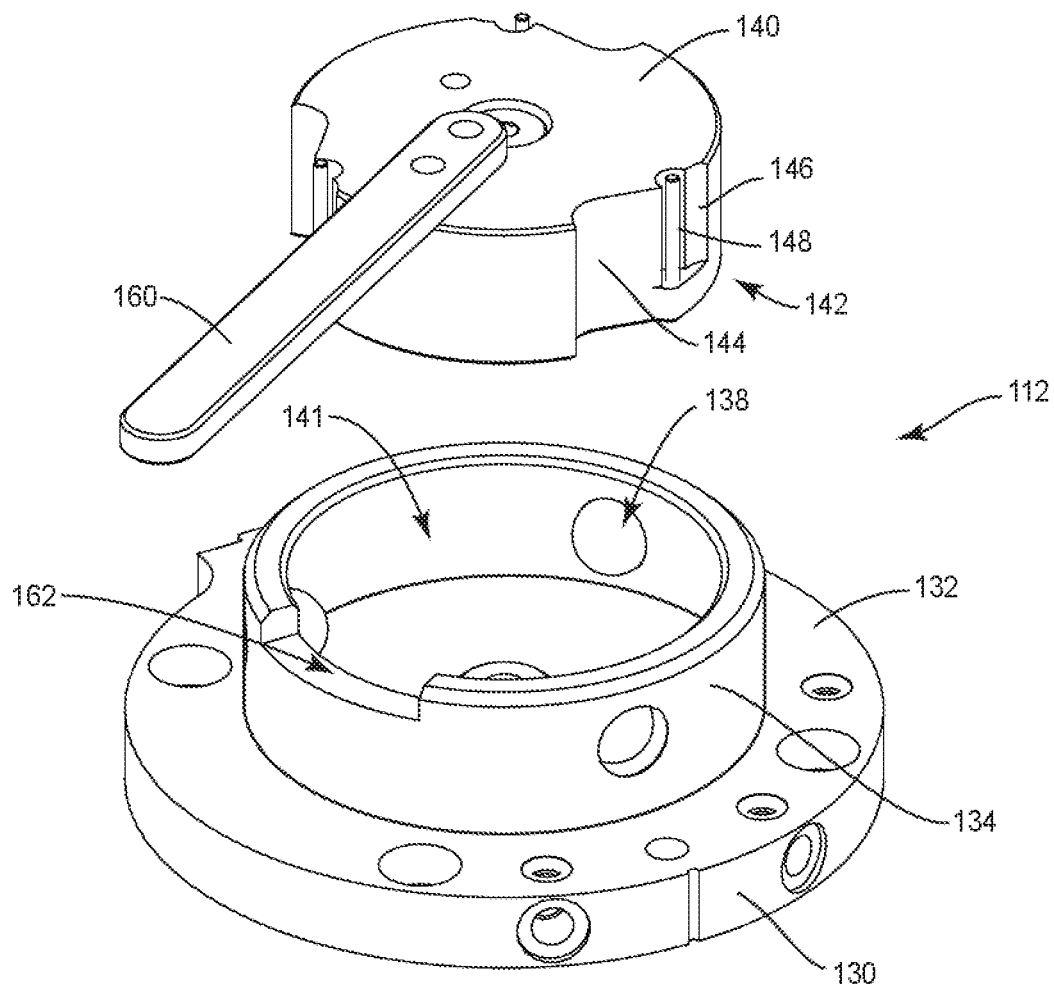
FIG. 8 is an exploded perspective view of the master unit of the robotic tool changer of FIGS. 7A and 7B.

FIG. 8 is an exploded view of the master unit 112. The master unit 112 includes an actuation unit 140 and holding unit 130. The actuation unit 140 comprises a central hub, with a plurality of multi-faceted actuation surfaces 142 facing outwardly. The holding unit 130 comprises a cap 132 and a retention collar 134. The cap 132 is operative to attach to a robot arm (or, if desired, a robotic tool). The actuation unit 140 is disposed within a central bore defined by the retention collar 134. A plurality of passages 138 in the retention collar 134 each holds a rolling member 116, such as a metal sphere or a cylinder. The actuation unit 140 and holding unit 130 are operative to partially rotate with respect to each other to move the robotic tool changer 110 between decoupled and coupled states. To facilitate this in a manually actuated embodiment, a handle 160 attached to the actuation unit 140 extends through a channel 162 formed in the lip of the retention collar 134, and through a window formed in the tool unit 120 (see FIG. 7B). In another embodiment, the rotation of the actuation unit 140 relative to the retention collar 134 may be actuated by a motor, pneumatic piston, or the like, or by a mechanical linkage to such drive mechanism.

Figure 9B:
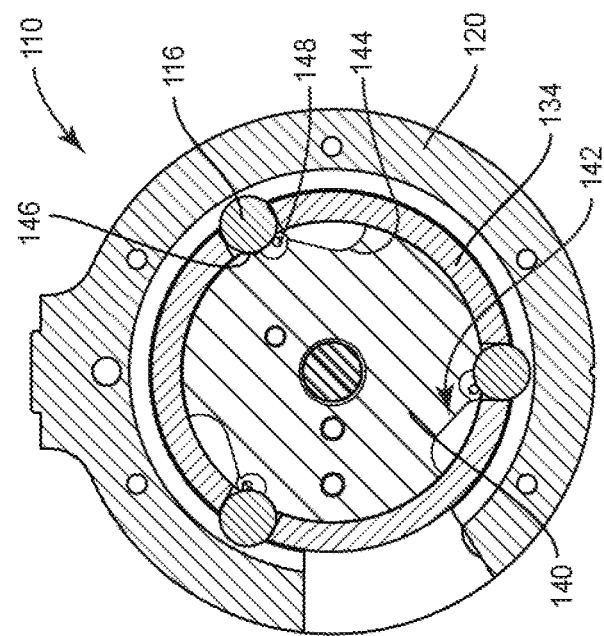
FIG. 9B is a top sectional view of the robotic tool changer of FIGS. 7 and 8 in a coupled state.
Figure 9A:
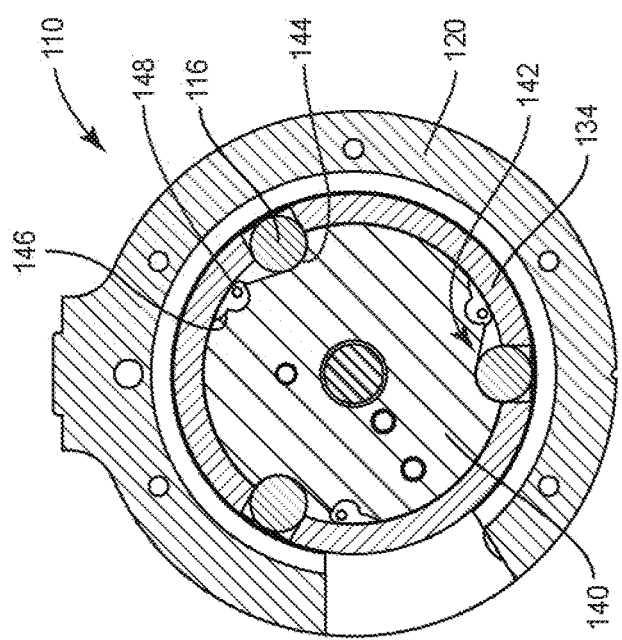
FIG. 9A is a top sectional view of the robotic tool changer of FIGS. 7 and 8 in a decoupled state.
Figure 10B:
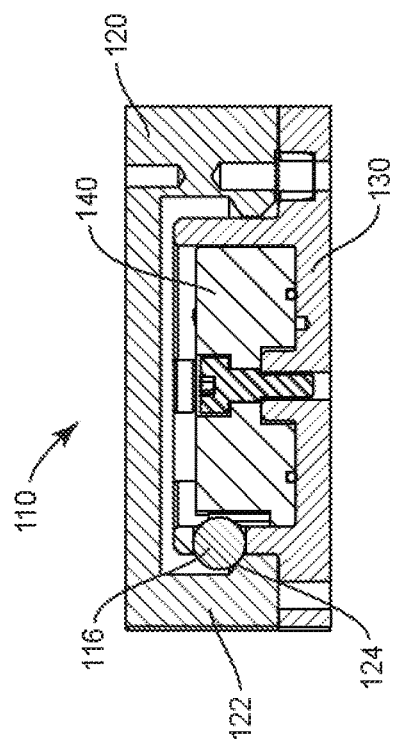
FIG. 10B is a side sectional view of the robotic tool changer of FIGS. 7-9 in a coupled state.
Figure 10A:
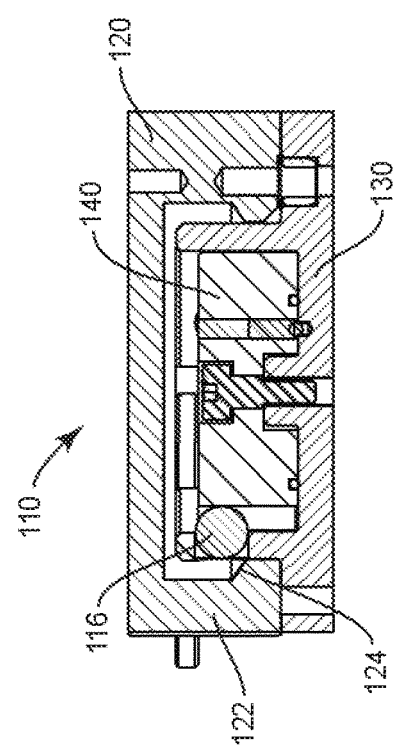
FIG. 10A is a side sectional view of the robotic tool changer of FIGS. 7-9 in a decoupled state.

FIG. 9A is a top sectional view of the robotic tool changer 110 in an uncoupled state, and FIG. 10A is a side sectional view of the uncoupled state. FIGS. 9B and 10B are corresponding sectional views in the coupled state. Initially, as depicted in FIGS. 9A and 10A, the rolling members are retracted, against the retaining surface 144. In this position, they do not extend past the outer wall of the retention collar 134, allowing the tool unit 120 to freely slide on and off over the master unit 112.

Rotation of the actuation unit 140, relative to the holding unit 130 (which is preferably locked against rotation relative to the tool unit 120), moves the robotic tool changer 110 to the coupled state, as depicted in FIGS. 9B and 10B. In particular, the rotation is operative to urge the rolling members outwardly, until they are in a fully extended position, as they seat against the locking surfaces 146. In this position, the rolling members 116 press against the coupling surface 124 of the tool unit, locking the tool unit 120 to the master unit 112.

As described above, in moving from the retaining surface 144 to the locking surface 146, each rolling member 116 deforms a pin 138. The pin 138 remains deformed when the robotic tool changer 110 is in the coupled state, thus pressing the rolling members 116 against the locking surface 146. A detent mechanism (not shown), may provide audible and tactile feedback when the robotic tool changer 110 is fully in the coupled or decoupled state. This embodiment may also be made washable by the provision of elastomeric sealing members between the parts to prevent the incursion of liquid.

In this embodiment, the outer end of each passage 138 in the retention collar 134 has a diameter slightly less than the diameter of the rolling members 116. This prevents the rolling members 116 from falling out of their respective passages 138 when the robotic tool changer 110 is decoupled and the tool unit 120 is removed from the master unit 112. The inner end of each passage 138 is, like the bore of the passage 138 itself, slightly larger than the diameter of the rolling members 116.

Figure 11:
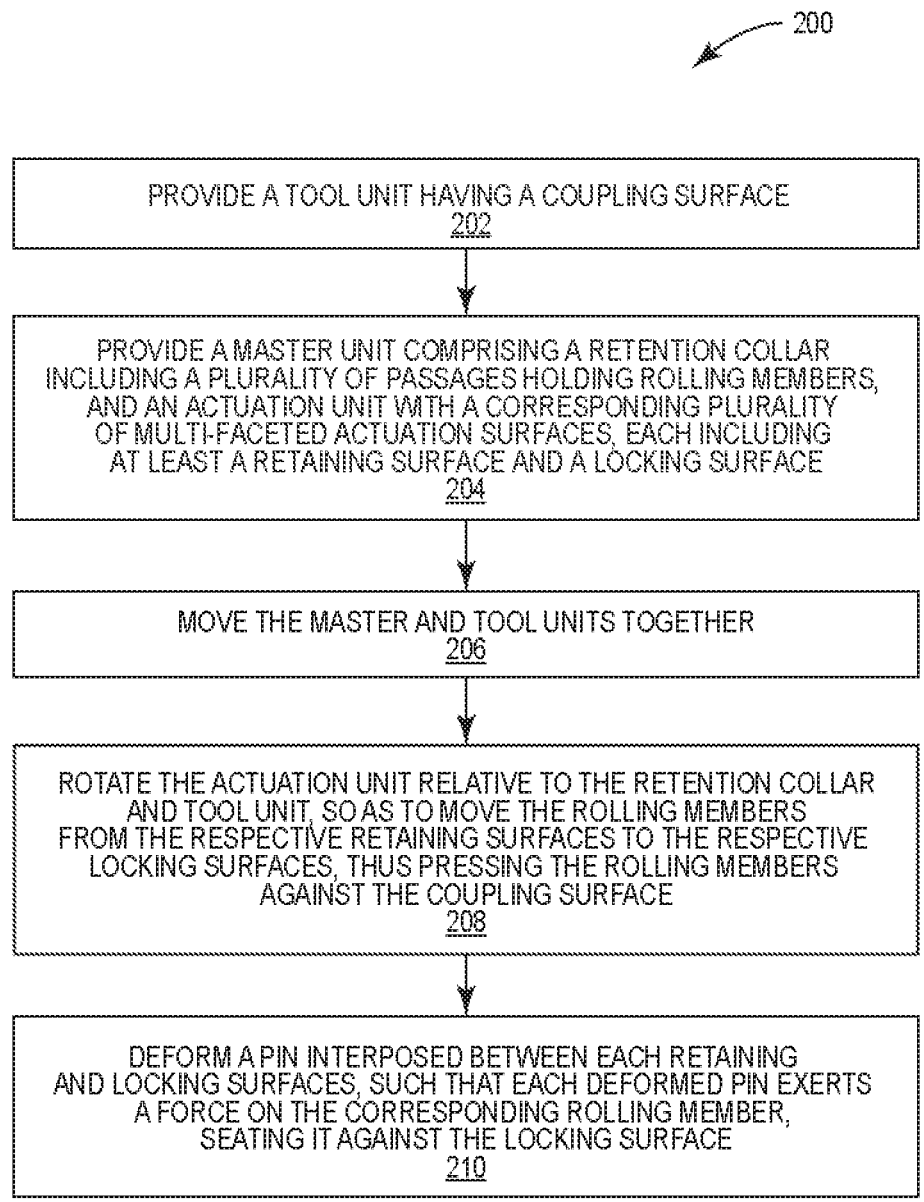
FIG. 11 is a flow diagram of a method of coupling master and tool units of a robotic tool changer.

FIG. 11 depicts the steps of a method 200 of coupling a robotic tool changer 10, 110 master unit 12, 112 to a tool unit 20, 120. A tool unit 20, 120 having a coupling surface 24, 124 is provided (block 202), as well as a master unit 12, 112 comprising a retention collar 34, 134 including a plurality passages 38, 138 holding rolling members 16, 116, and an actuation unit 40, 140 comprising a corresponding plurality of multi-faceted actuation surfaces 42, 142, each including at least a retaining surface 44, 144 and a locking surface 46, 146 (block 204). The master unit 12, 112 and tool unit 20, 120 are moved together (block 206). The actuation unit 40, 140 is rotated relative to the retention collar 34, 134 and tool unit 20, 120, so as to move the rolling members 16, 116 from the respective retaining surfaces 44, 144 to the respective locking surfaces 46, 146, thus pressing the rolling members 16, 116 against the coupling surface 24, 124 of the tool unit 20, 120 (block 208). A pin 48, 148 interposed between each retaining surface 44, 144 and locking surface 46, 146 is deformed, such that each deformed pin 48, 148 exerts a force on the corresponding rolling member 16, 116, seating it against the locking surface 46, 146 (block 210).

Embodiments of the present invention provide a compact, simple, inexpensive robotic tool changer 10, 110, which is particularly suited to manual actuation, but which may also be powered. The robotic tool changer 10, 110 includes an inherent locking feature, which applies a continuous force against rolling members 16, 116, holding them against the locking surfaces 46, 146, and hence holding the robotic tool changer 10, 110 in the coupled state. The compact design may easily be modified to be washable, further extending the utility of the robotic tool changer 10, 110 to applications requiring frequent sanitation.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A robotic tool changer, comprising:
    a tool unit operative to be affixed to one of a robot arm and a robotic tool, and including a coupling surface;
    a master unit operative to be affixed to the other of the robot arm and the robotic tool,
    and including,
    a plurality of rolling members;
    a retention collar comprising a cylindrical sleeve having a corresponding plurality of passages formed therein, each passage operative to partially contain a rolling member;
        an actuation unit abutting the retention collar and having a corresponding plurality of multi-faceted actuation surfaces, each including at least a retaining surface and a locking surface; and
        a deformable pin interposed between each retaining surface and corresponding locking surface, and operative to hinder movement of the rolling member between the retaining and locking surfaces.

2. The robotic tool changer of claim 1 wherein the actuation unit is operative to rotate relative to the retention collar such that when each passage aligns with a retaining surface, the respective rolling member partially recedes into the retaining surface, clearing the coupling surface of the tool unit to decouple from the master unit, and when each passage aligns with a locking surface, the respective rolling member is forced against the coupling surface, coupling the tool unit and master unit together.

3. The robotic tool changer of claim 2 wherein when a positive force is required to move the rolling members between respective locking and retaining surfaces, to at least partially deform a pin.

4. The robotic tool changer of claim 3 wherein the pin is partially deformed when the rolling member is adjacent the locking surface, thus exerting a force retaining the rolling member on the locking surface.

5. The robotic tool changer of claim 1 further comprising a detent mechanism operative to provide feedback indicating that the tool changer is fully in the coupled or decoupled state.

6. The robotic tool changer of claim 1 wherein one opening of each passage in the retention collar has a diameter less than that of the rolling member, such that each rolling member is retained partially within the passage when the master and tool units of the tool changer are decoupled.

7. The robotic tool changer of claim 1 wherein the deformable pin is fixed at one end.

8. The robotic tool changer of claim 1 wherein the deformable pin is fixed at both ends.

9. The robotic tool changer of claim 1 further comprising an elastomeric sealing member at the interface between the master and tool units, the sealing members operative to seal the interior of the robotic tool changer from the incursion of fluid.

10. The robotic tool changer of claim 1 wherein
    the tool unit comprises a stem, and the coupling surface comprises a circumferential lip on the stem;
    the master unit comprises a central bore operative to receive the stem, the bore defined by the retention collar; and
    the actuation unit is disposed annularly about the retention collar, with the multi-faceted actuation surfaces facing the retention collar.

11. The robotic tool changer of claim 10 wherein
in a decoupled state, rolling members recede into the respective retaining surface and the stem is clear to exit the bore; and
in a coupled state, rolling members are forced by the locking surface against the coupling surface, holding the stem of the tool unit into the bore of the master unit.

12. The robotic tool changer of claim 1 wherein
the actuation unit comprises a central hub, with the multi-faceted actuation surfaces facing outwardly;
the retention collar is disposed annularly about the actuation unit; and
the tool unit comprises a cylindrical sleeve sized to slide over the retention collar, and the coupling surface comprises a circumferential lip on the inner surface of the sleeve.

13. The robotic tool changer of claim 12 wherein
in a decoupled state, rolling members recede into the respective retaining surface and the sleeve is clear to slide off of the retention collar; and
in a coupled state, rolling members are forced by the locking surface against the coupling surface, holding the sleeve of the tool unit over the master unit.

14. A method of coupling a robotic tool changer master unit to a tool unit, comprising:
providing a tool unit having a coupling surface;
providing a master unit comprising a retention collar including a plurality of passages holding rolling members, and an actuation unit comprising a corresponding plurality of multi-faceted actuation surfaces, each including at least a retaining surface and a locking surface;
moving the master and tool units together;
rotating the actuation unit relative to the retention collar and tool unit, so as to move the rolling members from the respective retaining surfaces to the respective locking surfaces, thus pressing the rolling members against the coupling surface; and
deforming a pin interposed between each retaining and locking surfaces, such that each deformed pin exerts a force on the corresponding rolling member, seating it against the locking surface.

15. The method of claim 14, wherein the actuation unit is disposed annularly around the retention collar, and moving the master and tool units together comprises moving a stem of the tool unit into a bore formed in the retention collar, and wherein rotating the actuation unit relative to the retention collar and tool unit comprises rotating the actuation unit so as to displace rolling members inwardly against the coupling surface.

16. The method of claim 14, wherein the retention collar is disposed annularly around the actuation unit, and moving the master and tool units together comprises moving a cylindrical sleeve of the tool unit over the retention collar, and wherein rotating the actuation unit relative to the retention collar and tool unit comprises rotating the actuation unit so as to displace rolling members outwardly against the coupling surface.

* * * * *